United States Patent Office 3,476,907
Patented Nov. 4, 1969

3,476,907
PROCESS FOR OBTAINING A PERMANENT FLOW OF PLASMA
Marc Foex, Paris, and Robert Delmas, Mont-Louis, France, assignors to Centre National de la Recherche Scientifique, Paris, France
Filed Jan. 3, 1967, Ser. No. 606,964
Claims priority, application France, Jan. 7, 1966, 45,218; Nov. 7, 1966, 82,765
Int. Cl. B23k *31/00*
U.S. Cl. 219—121       12 Claims

ABSTRACT OF THE DISCLOSURE

The disclosure relates to a process and means for producing an easily controllable permanent flow of plasma of high energy. This permanent flow consists of the principal and distinct flow of plasma obtained by the conjunction of the converging elementary plasma flows produced by at least two blow-pipes. The energy dissipated in said principal flow as well as the form thereof is monitored by creating a heating current within a path consisting of at least parts of the elementary flows and including their point of convergence and by controlling the length of the path within said elementary flows.

---

The invention relates to the processes and means for obtaining a permanent flow of plasma of high energy starting from the flows of at least two blow-pipes, preferably at least one of which is a plasma blow-pipe, these blow-pipes being positioned such, with respect to one another, that their respective individual flows, which will be hereafter called "elementary plasma flows," converge with respect to one another to form a permanent plasma flow, which will be hereafter referred to under "principal plasma flow," resulting from tthe conjuncion of the above elementary plasma flows in a direction distinct from the directions of said elementary plasma flows.

An object of the invention is to improve the yield of the energy available in the principal plasma flow.

A further object of the invention is to provide means enabling a control of the energy dissipated in the principal plasma flow as well as of the form of this flow. Another object of the invention is to permit the formation of plasmas of gases which may not be produced with conventional plasma blow-pipes, for instance due to their great corrosiveness with respect to the electrodes used in such blow-pipes.

Other objects of the invention will appear as the following description will proceed.

In its broadest aspect, the invention consists in creating a heating electric current between points, hereinafter called "injection point," of said elementary plasma flows, one per elementary plasma flow, in a manner such, that said heating current travels within paths including the point of convergence of said elementary flows and at least parts of each of said elementary plasma flows, and in controlling the energy fed into these elementary flows and, according to preferred aspects of the invention, the lengths of the paths available between the different injection points.

These provisions enable the recovery of most of the electric energy, which can be considerable, fed into said elementary plasma flows, in the principal plasma flow with a yield which reaches 80 to 90% or more.

For the sake of illustrating the invention, several of its preferred embodiments will be described here below, with reference to the drawings in which.

In the preferred embodiments of the invention, the above blow-pipes consist of plasma blow-pipes with internal arc working either on alternating current or, and preferably, on continuous current.

Figure 1:
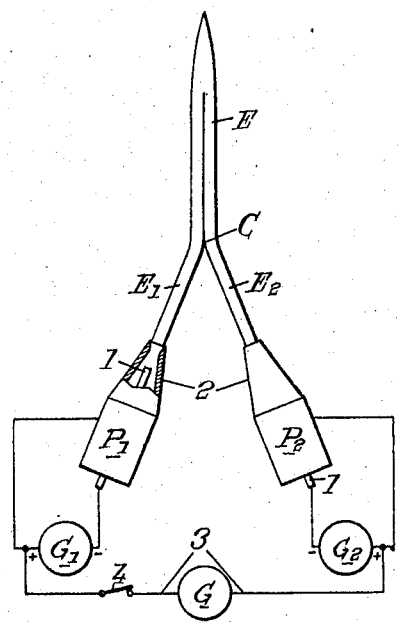
FIGURE 1 is a diagrammatical view of an installation, according to a first one of its embodiments, for obtaining a permanent flow of plasma of high energy.

According to a first embodiment of the invention shown in FIGURE 1, two plasma blow-pipes $P_1$, $P_2$ with internal arc and supplied with continuous current by two electric generators $G_1$, $G_2$ respectively, are positioned such that the two elementary plasma flows $E_1$, $E_2$ originating respectively from said blow-pipes $P_1$, $P_2$ converge in a point C and unite with each other to form a principal plasma flow E which constitutes the permanent plasma flow, the energy of which is sought to be controlled.

Assuming that the two plasma blow-pipes $P_1$, $P_2$ are substantially identical and are operated in the same conditions (nature and flow of the plasma forming gas, electrical power, diameters of the anodes, etc.), the principal flow E resulting from the conjunction of the two elementary flows $E_1$, $E_2$ will be located substantially along the bisector formed by the two above plasma flows $E_1$, $E_2$.

In the contrary if the characteristics of the two plasma blow-pipes are different from each other, the direction of the principal plasma flow E will tend to get closer to the direction of the elementary plasma flow originating from the more powerful plasma blow-pipe, for instance, the one in which the greater electric energy is dissipated or the one which is supplied with the greatest flow of plasma forming gas.

Considering the blow-pipes themselves, they may be constituted in any conventional manner, for instance with a cathode 1 and an anode 2 respectively connected to the negative and positive terminals of the corresponding generators $G_1$ or $G_2$, said anode 2 having preferably an exterior shape which does not hinder the bringing together, close to one another of several plasma blow-pipes of the same type.

The two blow-pipes $P_1$, $P_2$ (FIG. 1) are for instance positioned such that the two elementary flows $E_1$, $E_2$ produced by these blow-pipes form an acute angle for instance of about 30°.

According to the invention, these blow-pipes $P_1$, $P_2$ are caused to cooperate with an electric current supplying source G independent from the generators $G_1$ and $G_2$, and which will be referred to hereafter as the "source" G, in a manner such that each elementary plasma flows $E_1$, $E_2$ be travelled by an electric current circulating between one point of each of said elementary flows and their point of convergence C.

This provision appears to be of great advantage since it has been found, as this will be illustrated hereafter, that the greatest portion of the electric energy supplied by the source G into the elementary plasma flows is recoverable in the principal plasma flow, so that the energy available in the form of heat in the principal plasma flow may be far greater than the energy which could ever be obtained in the elementary plasma flows of the plasma blow-pipes $P_1$, $P_2$, in particular due to the fall of potential along the plasma which is far greater than within the blow-pipes.

Figure 4:
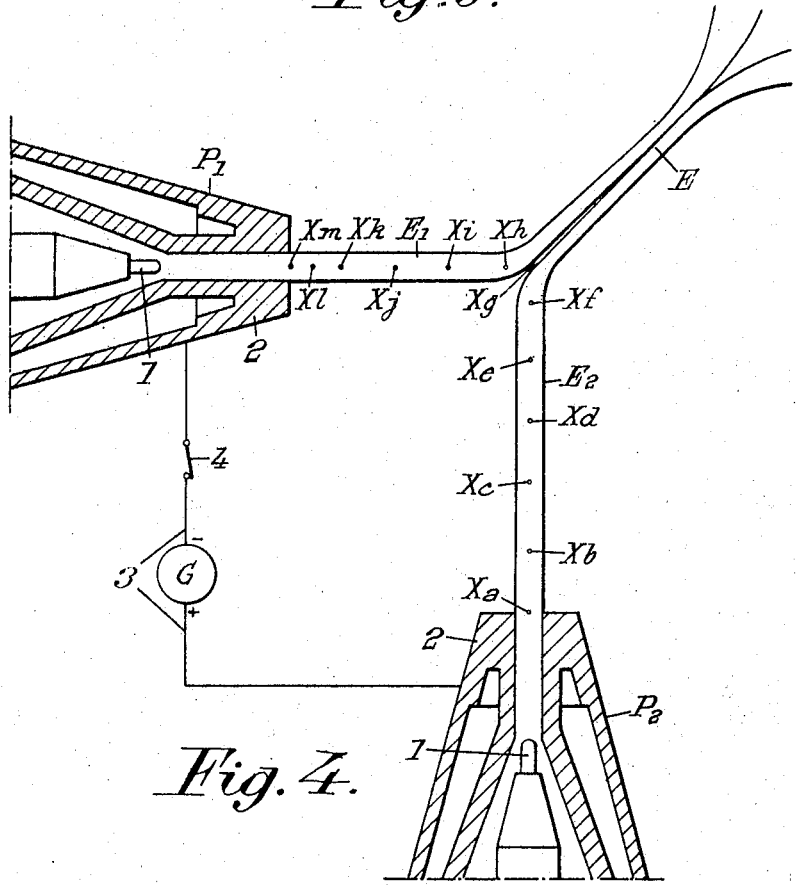
FIGURE 4 is a diagrammatically partial view of the geometary of a permanent flow of plasma obtained in an installation of the type represented in FIGURE 1.

The foregoing may be illustrated by the following experiment which was carried out with an installation as represented in FIGURE 4, in which is represented the principal plasma flow E resulting from the conjunction of two elementary flows $E_1$, $E_2$ of argon forming an angle of 90° prior to their convergence.

The two plasma blow-pipes $P_1$, $P_2$ were positioned such that the elementary plasma flow $E_1$ had a length of 45 mm. and the elementary plasma flow $E_2$ a length of 65 mm.

The two plasma blow-pipes were respectively supplied with argon under a flow of 6 l./mn. The energy dissipated in each of these blow-pipes was of 6 kw. (20 v., 300 a.).

The source G for injecting electrical current into the elementary plasma flows provides a current of 110 a. under 130 v. when the switch 4 is closed.

In such conditions, the direction of the principal plasma flow E was close to the direction of the bisector of the angle formed by the two elementary plasma flows $E_1$, $E_2$ and its length was of about 60 mm.

The distribution of the electrical potentials (measured by means of electrodes of tungsten and of a voltmeter of great impedance) along these elementary flows is given in the table herebelow, the positive terminal of the source G being connected to the anode of the plasma blow-pipe $P_2$.

| Points: | V. |
|---|---|
| $X_a$ | 130 |
| $X_b$ | 120 |
| $X_c$ | 110 |
| $X_d$ | 100 |
| $X_e$ | 90 |
| $X_f$ | 80 |
| $X_g$ | 75 |
| $X_h$ | 70 |
| $X_i$ | 60 |
| $X_j$ | 50 |
| $X_k$ | 40 |
| $X_l$ | 30 |
| $X_m$ | 0 |

The points $X_a$ and $X_m$ are respectively located at the outlets of the blow-pipes $P_1$, $P_2$ while the point $X_g$ corresponds to the above point of convergence C of the elementary plasma flows $E_1$, $E_2$.

It should be noted that the principal plasma flow E is perfectly neutral from the electrical standpoint.

It should also be noted that the smaller the gaseous flows supplied to the blow-pipes $P_1$, $P_2$, the other parameters remaining unchanged, the greater the lengths of the flows of plasma obtained and the greater the possible plasma electrical circuit, able to receive a greater amount of electrical energy from the source G under the same intensity, thus finally the greater the energy which can be supplied to the elementary plasma flows.

To that effect the positions of the injection points in the plasma elementary flows may be varied, the plasma blow-pipes remaining in a fixed position with respect to one another.

According to other embodiments of the invention, one of the electrodes of each of the plasma blow-pipes acts as a current injection point within said elementary plasma flows, these plasma blow-pipes being then permitted to move with respect to their first positions subject to keeping the plasma elementary flows permanently converging with one another.

In FIGURE 1, the anodes 2 of both blow-pipes $P_1$, $P_2$ constitute the injection points, in the elementary plasma flows $E_1$ and $E_2$, of the electric current supplied by the source G (which consists of a generator of monophased continuous or alternating current) through electric connections 3 provided between, on the one hand, the two terminals of the source G and, on the other hand, the two anodes 2, and controlled by a switch 4.

Of course, the source G could be arranged such as to enable the elementary plasma flows $E_1$, $E_2$ to be travelled by a heating electric current circulating through the point of convergence C and between either the two cathodes of the two blow-pipes, or the cathode of one of the blow-pipes and the anode of the other blow-pipe.

The first arrangement described hereabove is preferable, due to the fact that the anode is always bigger and better refrigerated than the cathode in most of the plasma blow-pipes. Further, the anode is generally constituted by materials (copper) which are better conductors of electricity than the materials (tungsten, molybden, graphite) which constitute the cathode.

Figure 2:
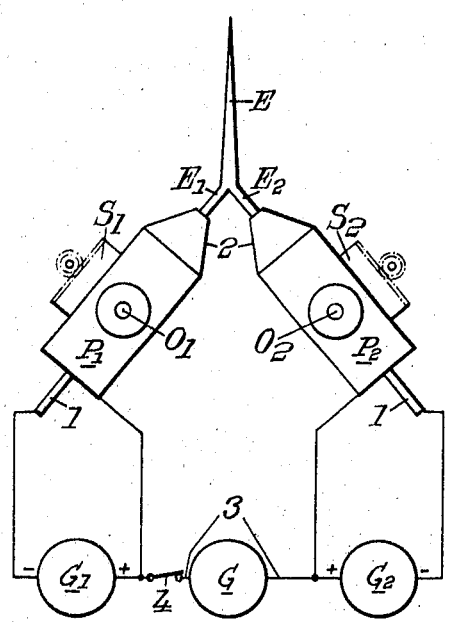
FIGURES 2 and 3 show the above installation with means diagrammatically represented for controlling the energy dissipated in the installation of FIGURE 1.
Figure 3:
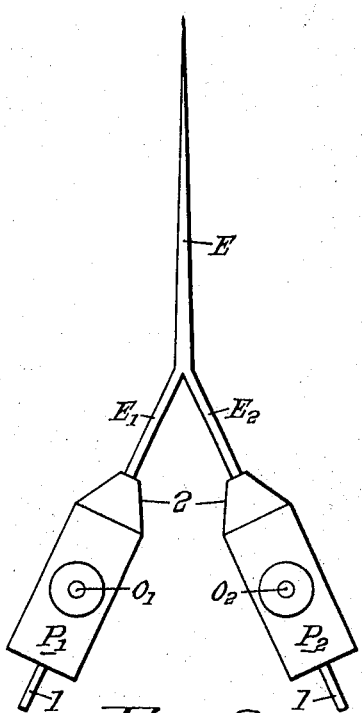

In such instance, the lengths of the paths available for the heating electric current travelling through the elementary plasma flows may be controlled by either modifying the angle formed by the elementary flows originating from the plasma blow-pipe $P_1$, $P_2$, by rotating the blow-pipes about corresponding axes $O_1$, $O_2$, perpendicular to the plan defined by the two elementary plasma flows $E_1$, $E_2$ as represented in FIGURES 2 and 3 (in which the electric connections are substantially the same than in FIGURE 1), or by allowing the supports $S_1$, $S_2$ of these blow-pipes to be displaced toward or on the contrary away from the point of convergence C (as diagrammatically represented in FIGURE 2) along the directions of the elementary flows $E_1$, $E_2$.

The two plasma blow-pipes $P_1$, $P_2$ are represented in FIGURE 2 in a position corresponding to a small length of the two elementary plasma flows $E_1$, $E_2$, the principal plasma flow E then receiving a relatively small amount of energy.

On the contrary the two blow-pipes are represented in FIGURE 3 in a position such that the lengths of the two elementary plasma flows $E_1$, $E_2$ are much longer, the principal plasma flow E then receiving a much more important amount of energy.

The greater the paths available for the heating current provided by source G within the elementary flows, the greater also the energy which can be available in the principal plasma flow.

As it appears already from the foregoing, a great number of parameters may thus be acted upon to control the energy dissipated in the principal plasma flow.

Among these parameters, one may cite the nature of the plasma forming gas used in the blow-pipes $P_1$, $P_2$, the flow of these gases through said blow-pipes, the energy supplied by the source G, etc.

In particular, in the above experience described with reference to FIGURE 4, the fall of potential by length unit is minimum when argon is used as the plasma forming gas, these values increasing in the presence of a diatomic gas such as hydrogen.

When plasma blow-pipes with internal arc permitting the formation of laminar flows under a low gaseous flow are used, the principal plasma flow resulting from the conjunction of these laminar elementary flows will be long and relatively narrow.

However, by acting on other parameters, for instance, by increasing the angle formed by the elementary flows or the power delivered into the elementary flows by the source G, the principal plasma flow E will tend increase considerably in volume to present the contour of a feather. Such principal plasma flow is of a considerable interest in those of the applications where an electrically neutral plasma flow with an extremely small flowing speed is needed, for instance for treating powdery materials.

When the angle formed between the elementary flows becomes relatively small, and the energy dissipated therein by the source G very important, several principal plasma flows, all having contours of feathers however separated by dark zones in the area of the point of convergence, will be obtained.

Figure 5:
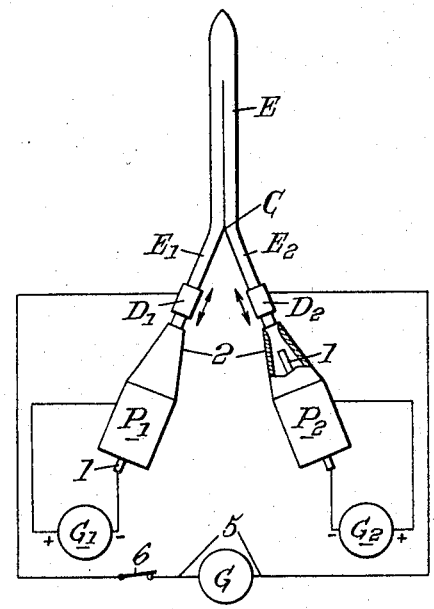
FIGURE 5 represents an alternative according to the invention of the means for controlling the energy of the permanent flow of plasma.

The control of the lengths of the paths available for the electric heating current supplied by the source G may also be advantageously performed in another embodiment of the invention represented in FIGURE 5 (in which the same reference numerals are used for designating the same elements than in the foregoing figures) and in which the injection points of the current supplied by source G are located within the elementary plasma flows $E_1$, $E_2$ downstream from the outlets of the plasma blow-pipes $P_1$, $P_2$. This is advantageously obtained by means of auxiliary electordes $D_1$, $D_2$ connected to the source G by connections lines 5, themselves controlled by a switch 6. Such auxiliary electrodes $D_1$, $D_2$ are then preferably constituted by annular elements surrounding the corresponding elementary flows, means (not represented) being then advantageously provided to cool these electrodes $D_1$, $D_2$.

The lengths of the path for the heating current within the elementary flows $E_1$, $E_2$ may then be controlled very easily by moving these electrodes along the two corresponding elementary plasma flows (as symbolically represented by the arrows).

The means according to the invention are very advantageous in that the greatest portion of the energy supplied by the source G is recoverable in the prinicpal plasma flow E in the form of heat. The energy contained in the principal plasma flow E can be considerable as shown for instance by the measures thereof, the results of which are given in the tables below, which clearly establish the high yield of the means according to the invention.

The results reported in Table I were obtained with an installation as represented in FIGURES 1 and 4 in which the two plasma blow-pipes were operated with continuous current and in which the angle of the two elementary flows was of 40°.

The heat developed by the principal plasma flow was recovered in a calorimeter, where it was measured:

TABLE I

| Continuous energy supplied by the source G, kw. | Total energy supplied to the plasma by the generators $G_1$, $G_2$ and the source G, kw. | Energy contained in the principal plasma flow E, kw. | Yield, percent |
| --- | --- | --- | --- |
| 16 | 18.2 | 15.4 | 84.5 |
| 14 | 16.5 | 14.1 | 85.5 |
| 20 | 22.3 | 18.6 | 83.5 |
| 30 | 32.2 | 25.5 | 79 |
| 45 | 48.2 | 38.8 | 80.5 |

The same measures were carried out with plasma blow-pipes $P_1$, $P_2$ operated under alternating current and with source G of alternating current. The results are reported in the table herebelow.

TABLE II

| Continuous energy supplied by the source G, kw. | Total energy supplied to the plasma by the generators $G_1$, $G_2$ and the source G, kw. | Energy contained in the principal plasma flow E, kw. | Yield, percent |
| --- | --- | --- | --- |
| 14.4 | 15.7 | 13.3 | 84.5 |
| 22.4 | 23.1 | 14 | 60.5 |
| 31 | 32 | 20 | 62.5 |
| 14 | 16.9 | 13.6 | 80.5 |
| 20.2 | 22.5 | 18.8 | 83.5 |
| 21.8 | 25.6 | 20.8 | 81 |
| 19.6 | 20.6 | 14.8 | 72 |
| 18 | 19.1 | 13.5 | 70.5 |
| 16.2 | 18.3 | 15.5 | 84.5 |
| 22.4 | 25.4 | 20 | 79 |
| 13.8 | 16.4 | 15.3 | 93 |
| 24.3 | 24.8 | 21.2 | 85.5 |
| 32.5 | 33.8 | 28 | 83 |

Figure 6:
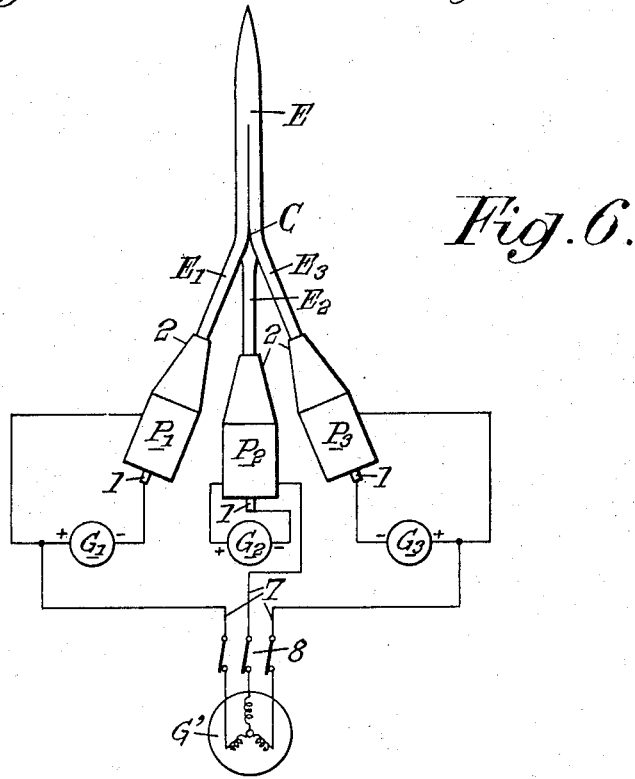
FIGURES 6 and 7 represent other embodiments of installations for the production of a permanent flow of plasma provided with the means according to the invention for controlling the energy of this flow.

The invention has been described heretofore with installations using two plasma blow-pipes, the source G being a source of continuous or alternating current. Of course, several other types of installations may be used to achieve the same results. One of these other embodiments is represented in FIGURE 6 in which the external source of current G' is a generator of alternating triphased current adapted to inject an electric heating current in the elementary plasma flows $E_1$, $E_2$ and $E_3$ produced by three plasma blow-pipes $P_1$, $P_2$ and $P_3$ whose respective cathodes 1 and anodes 2 are connected to generators $G_1$, $G_2$ and $G_3$. These blow-pipes are positioned such that said elementary plasma flows $E_1$, $E_2$ and $E_3$ converge in a common point C and unite in a distinct principal plasma flow E.

In the installation represented, the source G is connected to the three anodes 2 through connecting lines 7 respectively controlled by switches 8.

According to another embodiment, not represented, the installation may comprise six plasma blow-pipes positioned such that their six elementary plasma flows converge into a common point to form the desired distinct principal plasma flow, these six plasma blow-pipes then cooperating with a source constituted by a generator of trihexaphased alternative current.

In other embodiments of the installations according to the invention one of the elementary plasma flows may already itself be constituted by a flow resulting from the conjunction of several individual flows in the same conditions than above.

Figure 7:
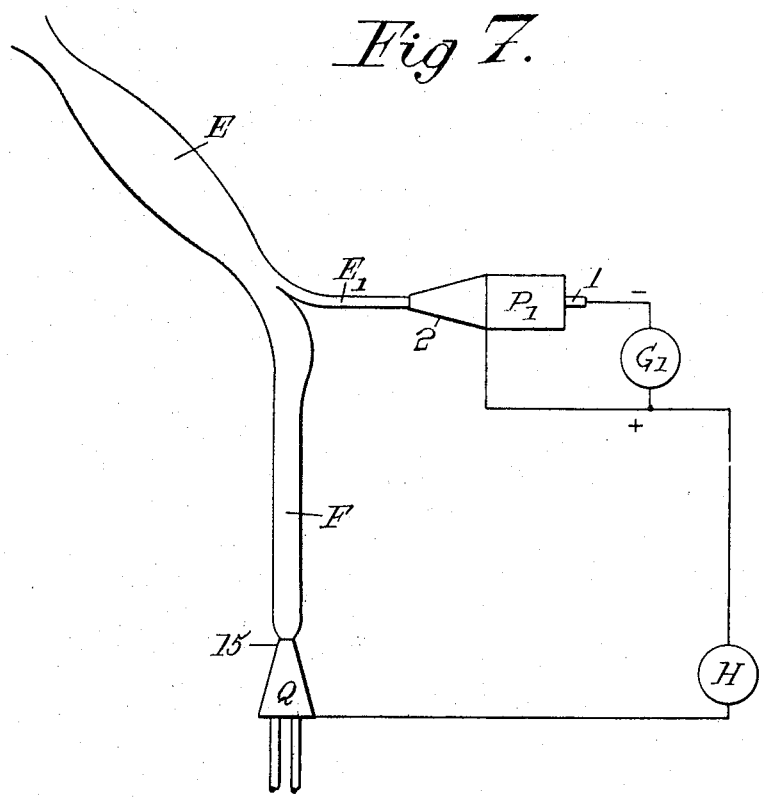

Still another embodiment of the installation is shown in FIGURE 7 in which one of the blow-pipes consists of a conventional blow-pipe Q operated through chemical combustion, this blow-pipe comprising an outlet nozzle 15 and being supplied with a fuel and the gas enabling combustion, such as oxygen, in a conventional manner.

These two blow-pipes $P_1$ and Q are positioned such that their two elementary flows $E_1$ and F unite with each other to form a principal distinct plasma flow E. The external source H for creating an electrical current in the elementary flows is then connected to the anode 2 of $P_1$ and to the nozzle of the blow-pipe Q. The latter may be advantageously cooled for instance by a circulation of water, not represented.

In the same spirit one may, when using an installation of the type represented in FIGURE 1, in a first step, produce two converging elementary plasma flows of gases having small reactivity with respect to the electrodes of the blow-pipes and then induce the creation of the heating current within the elementary flows and, in a second step, stop the generator $G_1$ of the blow-pipe $P_1$ and substitute to the initial gas supplied to the latter another gas which cannot be used as a plasma forming gas within the blow-pipe due to its strong activity with respect to the electrodes or of its corrosiveness (this gas could be constituted for instance by oxygen which would react with the cathode of tungsten if an arc was stricken between said cathode and the anode from the blow-pipe). The substituted gas then partakes to the carrying of the heating current within said path in the elementary plasma flows. As a matter of fact, it is possible to stop all the arcs in the plasma blow-pipes and to entertain with the only source G in a heating current within the above path.

This is particularly advantageous for forming plasmas of such gases, for instance in view of particular chemically reaction.

In addition it will be appreciated that such a process (as well as those described before) permits the formation of a plasma consisting of mixed gases with any composition desired.

Figure 8:
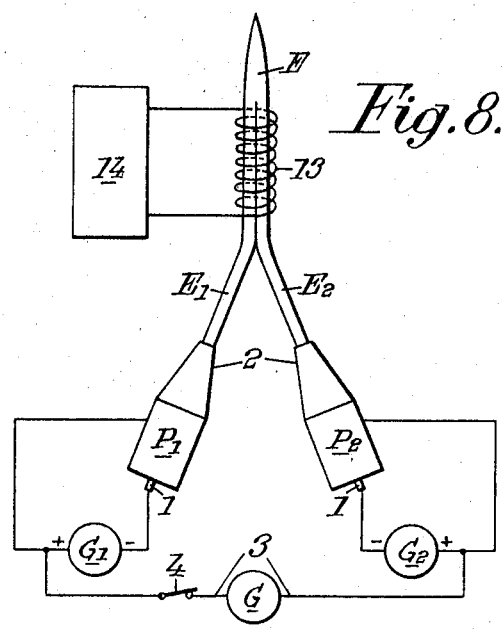
FIGURE 8 shows an installation of the type represented in FIGURE 1 with additional overheating means of the permanent flow of plasma.

The principal plasma flow may also be overheated for instance through an induction coil 13 supplied with electric current under high frequencies by a generator 14 (FIG. 8), the power delivered by this last generator being preferably variable.

Controlled plasma flows of the above type are particularly appropriate to the melting of powdery refractory material where erosion phenomenae must be avoided.

Figure 9:
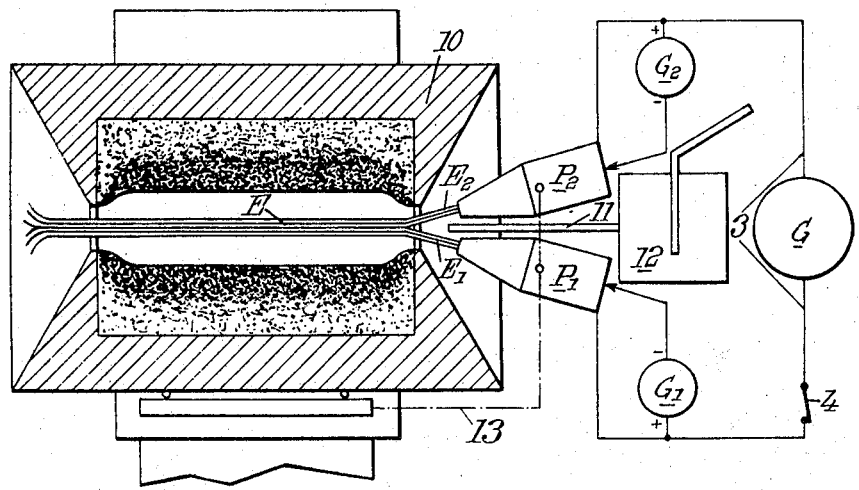
FIGURE 9 shows an installation of the type represented in FIGURES 1, 2 or 3 associated with a furnace for heating materials at high temperatures.

FIGURE 9 shows an installation for treating such materials in which the principal plasma flow E obtained with an installation of the type disclosed with reference to FIGURE 1, cooperates with a centrifugual furnace 10 for treating pulverulent materials. The blow-pipes $P_1$, $P_2$ are advantageously positioned such that the point of convergence of the two elementary flows $E_1$, $E_2$ be approximately at the entry of the furnace 10. This installation comprises further advantageously a feed system of pulverulent material comprising a feed conduit 11 located between the two flows $P_1$, $P_2$ and whose extremity lies just in front of the point of convergence C to permit the supply of a material in its close area, as well as a feeding device 12 capable of supplying said feed conduit 11 with variable amounts of pulverulent material.

It will be appreciated that the energy dissipated in the principal plasma flow E could be varied by any of the means contemplated hereabove, in particular by envisaging, on the one hand translational or rotational displacements of the plasma blow-pipes $P_1$, $P_2$, and/or, on the other hand, translational displacements of the furnace 10 depending upon the positions of the plasma blow-pipes (such dependence being diagrammatically represented by the dotted and dashed line 13) so as to keep the point of convergence C always positioned substantially at the entrance of the furnace.

Figure 10:
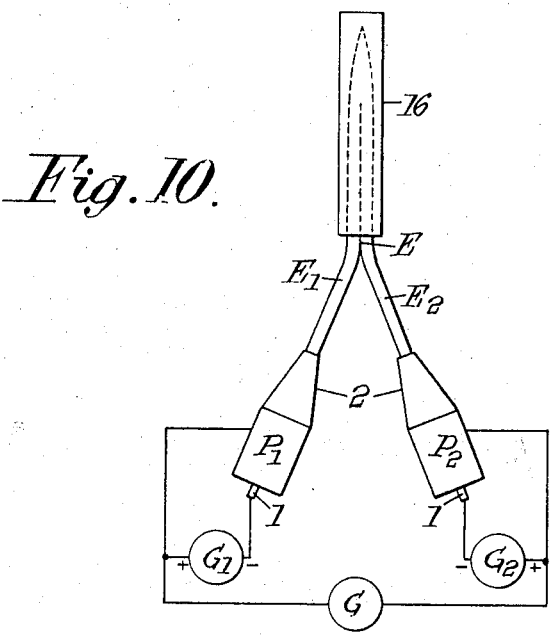
FIGURE 10 represents again an installation of the type represented in FIGURE 1 with means to temper the gases of the permanent flow of plasma.

Another very interesting application of this invention is the possibility of producing reactions between different gases at high temperatures. This principal plasma flow may cooperate with a tempering system 16 (FIG. 10), this tempering system being advantageously constituted by a metallic sleeve adapted to surround said principal plasma flow and cooled by a circulation of water or by a spray system using water or any other liquid or gas in order to control the force of the tempering process. The tempering of the gases of said principal plasma flow can be very powerful due to its electrical neutrality.

This last process may or may not be accompanied by a chemical reaction. Such a process could be used, for instance, for the production of the oxide $N_2O$ by causing an elementary flow of oxygen and an elementary flow of nitrogen used in appropriate proportions, to unite into a principal hot plasma flow, the $N_2O$ formed being then tempered and recovered at a much lower temperature.

These plasmas are particularly appropriate to many other applications such as for instance in:

The cutting of materials, in particular of metals,

The constitution of sources for the production of ultraviolet rays or of rays of comparison used in stellar spectrography, since the elementary and principal plasma flows constitute powerful emitters of radiations, The spectral analysis of materials, the latter being injected either in the principal plasma flow (which is not travelled by an electric current) or in one of the elementary flows (travelled by an electric current) according as desired, all of these flows being formed with a great homogeneity in form and temperature, The heating of gases for instance in view of supplying supersonic and hypersonic blow installations, The realization of mixed flow-systems, a portion of which is travelled by an electric current and another of which is not travelled by an electric current. It may be added here that a second independent source of electric current could be provided to cooperate with the principal plasma flow to inject a current in some of its portions, The study of reactions between gas and vapors either in the principal plasma or in the elementary plasma flow, etc.

While the invention has been described in connection with a particular preferred embodiment, it will be understood that the invention is not limited to that embodiment, but is intended to encompass all alernatives, modifications and equivalents as may be properly included within the spirit and scope of the invention as defined by the appended claims.

What is claimed is:

1. A method for controlling the configuration of a principal flow of plasma of high energy which comprises causing at least two generators to produce elementary flows of ionized gases converging with one another at a point to form said principal flow beginning at said point and extending along a general direction distinct from those of said elementary flows, creating an electric heating current between injection points of said elementary flows, one injection point per elementary plasma flow, in a manner such that said heating current travels within a path constituted by at least part of each of said elementary flows, said path including said point of convergence, and moving at least one of said generators relative to said point of convergence to control the configuration of said principal flow of plasma.

2. A method according to claim 1 wherein said generators comprise plasma blow-pipes with an internal arc supplied by an electric current.

3. A method according to claim 2 wherein, after said heating current has been established, the electric current supplied to the internal arc is cut off.

4. A method according to claim 3 wherein, after said electric current has been cut off, a gas different than that originally supplied to said blow pipe is substituted for the original gas.

5. A process accoridng to claim 4 wherein the different gas comprises a gas which could not be used as a plasma forming gas within the blow pipe due to its strong reactivity.

6. A process according to claim 5 wherein said different gas comprises oxygen.

7. A process for producing a permanent principal flow of plasma of high energy, which comprises, causing at least two generators to produce elementary flows of ionized gases converging with one another to form said principal flow along a general direction distinct from those of said elementary flows, creating an electric heating current between injection points of said elementary flows, one injection point per elementary plasma flow, in a manner such that said current travels within a path constituted by at least part of each of said elementary plasma flows, said path including their point of convergence, and after said heating current has been established, cutting off the electric current supplied to at least one of said generators to form an arc of the elementary flow of ionized gas therefrom.

8. A process according to claim 7 wherein the generators of ionized gases are plasma blow pipes with an internal arc supplied by an electric current.

9. A method according to claim 8 wherein, after said electric current has been cut off, a gas different from that orginally supplied to said blow pipe is substituted for the original gas.

10. A process according to claim 9 wherein said different gas comprises a gas which could not be used as a plasmas forming gas due to its strong reactivity.

11. A process according to claim 10 wherein said different gas comprises oxygen.

12. A process according to claim 10 wherein a chemical reaction is effected between plasma gases in said principal flow plasma.

References Cited
UNITED STATES PATENTS

| | | | |
|---|---|---|---|
| 3,147,329 | 9/1964 | Gage | 219—121 |
| 3,222,568 | 12/1965 | Richards | 219—121 X |
| 3,246,115 | 4/1966 | Johnson | 219—121 |
| 3,248,513 | 4/1966 | Sunnen | 219—121 |
| 3,300,561 | 1/1967 | Foex | 219—121 X |

JOSEPH V. TRUHE; Primary Examiner
W. DEXTER BROOKS, Assistant Examiner